(12) United States Patent
Steyer et al.

(10) Patent No.: US 9,172,547 B2
(45) Date of Patent: Oct. 27, 2015

(54) APPARATUS AND METHOD FOR SIGNATURE VERIFICATION

(71) Applicant: Thomson Licensing, Issy de Moulineaux (FR)

(72) Inventors: Jean-Marie Steyer, Cesson Sevigne (FR); Didier Roustide, Cesson Sevigne (FR)

(73) Assignee: Thomson Licensing, Issy-les Moulineaux (FR)

( * ) Notice: Subject to any disclaimer, the term of this patent is extended or adjusted under 35 U.S.C. 154(b) by 0 days.

(21) Appl. No.: 13/714,817

(22) Filed: Dec. 14, 2012

(65) Prior Publication Data

US 2013/0159721 A1    Jun. 20, 2013

(30) Foreign Application Priority Data

Dec. 16, 2011    (EP) .................................... 11306683

(51) Int. Cl.
*H04L 9/32*    (2006.01)
*H04N 21/443*    (2011.01)
(Continued)

(52) U.S. Cl.
CPC ............ *H04L 9/3281* (2013.01); *H04L 9/0894* (2013.01); *H04L 9/3247* (2013.01);
(Continued)

(58) Field of Classification Search
CPC ......... G06F 9/445; G06F 21/00; G06F 21/57; H04N 21/443; H04N 21/4623; H04N 21/4432; H04N 21/4627; H04L 9/3281
USPC ........................................................ 713/176
See application file for complete search history.

(56) References Cited

U.S. PATENT DOCUMENTS

| 6,938,166 | B1 * | 8/2005 | Sarfati et al. .................. 382/116 |
| 2005/0165937 | A1 | 7/2005 | Genevois |

(Continued)

FOREIGN PATENT DOCUMENTS

| CN | 201294575 | 8/2009 |
| EP | 0752786 | 1/1997 |

(Continued)

OTHER PUBLICATIONS

Kamperman et al., "Conditional Access System Interoperability Through Software Downloading", IEEE Transactions on Consumer Electronics, vol. 47, No. 1, New York, NY, Feb. 1, 2001, pp. 47-54.

(Continued)

*Primary Examiner* — Kambiz Zand
*Assistant Examiner* — Aubrey Wyszynski
(74) *Attorney, Agent, or Firm* — Myers Wolin LLC

(57) ABSTRACT

A receiver comprises a security processor and a first memory that stores software code or second stage authentication key and a signature for the software or the second stage key. The receiver also stores a plurality of verification keys (PUAK). When the receiver is switched on or reset, the software or second stage key and the signature are loaded from the first memory. The security processor then loads a PUAK and uses it to verify the signature. In case of successful verification, the software code or second stage key is used and the verification method ends; it is then possible to activate CA specific functions in the receiver. However, if the verification is unsuccessful, then it is verified if there are untried PUAKs. If there are no untried signatures, then the verification has failed and the software cannot be verified; the verification method ends. If there are untried signatures, then the next PUAK is loaded.

20 Claims, 2 Drawing Sheets

(51) Int. Cl.
*H04N 21/4623* (2011.01)
*H04N 21/4627* (2011.01)
*H04L 9/08* (2006.01)

(52) U.S. Cl.
CPC ......... *H04N21/443* (2013.01); *H04N 21/4432* (2013.01); *H04N 21/4623* (2013.01); *H04N 21/4627* (2013.01)

(56) References Cited

U.S. PATENT DOCUMENTS

| | | | | |
|---|---|---|---|---|
| 2009/0055612 | A1* | 2/2009 | Sibert | 711/163 |
| 2009/0070474 | A1* | 3/2009 | Aura et al. | 709/228 |
| 2010/0070772 | A1* | 3/2010 | Nakamura et al. | 713/176 |
| 2010/0125733 | A1* | 5/2010 | Kim et al. | 713/169 |
| 2010/0254536 | A1* | 10/2010 | Dellow | 380/278 |
| 2011/0231909 | A1 | 9/2011 | Shibuya | |

FOREIGN PATENT DOCUMENTS

| | | |
|---|---|---|
| EP | 0961193 | 12/1999 |
| JP | 2009211318 | 9/2009 |
| JP | 2010182032 | 8/2010 |
| WO | WO2009034696 | 3/2009 |

OTHER PUBLICATIONS

European Search Report dated Apr. 24, 2012.

\* cited by examiner

APPARATUS AND METHOD FOR SIGNATURE VERIFICATION

This application claims the benefit, under 35 U.S.C. §119 of EP Patent Application 11306683.1, filed 16 Dec. 2011.

TECHNICAL FIELD

The present invention relates generally to security, and in particular to verification of digital signatures.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is well known in the art to use so-called Conditional Access (CA) technology to protect digital content, such as e.g. premium value digital television programs. Such technology uses different cryptographic protocols to encrypt and later decrypt the digital content, and also to protect the terminals from unauthorized use.

The CA technology is implemented in receivers, for example television sets and so-called Set-Top Boxes (STBs), using some kind of (usually removable) security element that has been provided, directly or indirectly, to a user by a CA provider. A preferred implementation of such a security element is a smartcard, which is a well-known in the art.

It will be appreciated that it is usually necessary to pay in order to access CA protected digital content and that it is quite common for pirates to try to 'hack' the CA system in order to access the CA protected digital content without having to pay for it. As smartcards become more and more secure—i.e. harder and harder to hack—pirates tend to attack the receivers directly.

Naturally, receiver manufacturers have worked in improving the security of their receivers by implementing certain security features required and specified by the supported CA provider, and using a CA dedicated version of the main IC which implements in particular:
 a Secret Root Key (SRK), which can be implemented as a 128-bit symmetric key, and
 a Public Authentication Key (PUAK), which advantageously can be implemented as an asymmetric 1024 or 2048 bit RSA key.

These security features that are implemented by chip providers must satisfy the security requirements of a particular CA provided. It is quite likely that a first CA provider A has different security requirements that a second CA provider B. This can mean that components that are customized for A may not work for or be acceptable to B; besides, CA providers usually do not communicate their solutions to other CA providers.

Further, as CA providers often are commercial rivals, it may be difficult for them to agree on a common set of security requirements. This commercial rivalry thus pushes CA providers to improve their security requirements and to keep them secret.

For this reason, certain CA provides provide a proprietary security block for the chip provider to use instead of the chip providers 'standard' security features.

It can thus be seen that different CA providers provide different security features.

It will also be appreciate that the clients of the CA providers, such as pay TV operators, have an interest in being able to use products from a plurality of CA providers. So far, however, once an operator has selected a CA provider, it is difficult to switch to a new one for the following reasons:
 it is costly to change the installed receivers; this should be done to ensure that both old and new receivers can work the same way,
 it is difficult to provide to the new CA provider a platform that enables the required security features without risking decreased security.

For this reason, pay TV operators would like to be able to be as independent as possible from the CA providers so that the same receiver hardware can be used with different CA systems so that the different security requirements are independently supported.

The requirement that a receiver be compatible with a plurality of CA providers can be met if the security functions, i.e. the security block, of each CA provider is integrated into a chip provided by a chip manufacturer.

SW Authentication Chain:

In order to ensure that only authorized software is installed on a receiver, e.g. by verification at power up that the receiver embedded software (or a second stage authentication key) is valid, it is known to digitally sign the software (or the second stage authentication key) using a Private Asymmetric Key (PRAK) that advantageously is held by the CA provider. At power up, the receiver uses its Public Authentication Key (PUAK), which corresponds to the PRAK, to verify the signature of the receiver embedded software (or the second stage authentication key), as is well known in the art.

The PUAK for a CA provider is part of the customization of a chip to meet the security requirements of the CA provider.

So far, the PUAK of a single CA provider is stored in the chip. This means that it is not possible for the chip to be compatible with a plurality of CA systems, even if all the other security features of another CA provider are implemented in the chip.

The skilled person will thus appreciate that there is a need for a solution that allows a receiver to store and use a plurality of PUAKs. This invention provides such a solution.

SUMMARY OF INVENTION

In a first aspect, the invention is directed to an apparatus for verifying a digital signature for a digital data. The apparatus comprises a first memory configured to store a first verification key; a second memory configured to store the digital data, the digital data comprising boot code for the apparatus or a second stage authentication key to be used to authenticate further digital data; a processor configured to, upon power up or reset of the apparatus, receive the digital data and the digital signature, and to verify the digital signature by processing the digital signature with the first verification key. The first memory is further configured to store also a second verification key, wherein the first verification key and the second verification key respectively correspond to signature keys of a first signatory entity and a second signatory entity; and the processor is further configured to verify the digital signature by processing the digital data with the second verification key.

In a first preferred embodiment, the first memory is configured to store a plurality of verification keys. It is advantageous that the processor is configured to verify the digital signature using the digital signature and each of the stored verification keys until the digital signature is successfully verified or until it has unsuccessfully used every stored verification key.

In a second preferred embodiment, the processor is configured to verify the digital signature by processing the digital signature with the second verification key if the digital signature is not successfully verified using the first verification key.

In a third preferred embodiment, the processor is configured to verify the signature using the first verification key and the second verification key in parallel.

In a fourth preferred embodiment, the boot code is embedded. It is advantageous that the apparatus further comprises a second processor configured to execute the boot code in case the digital signature is successfully authenticated.

In a fifth preferred embodiment, the processor is further configured to, upon successful verification of the digital data, identify a current CA system and to activate CA specific functions.

In a sixth preferred embodiment, the first memory is non-writable.

In a second aspect, the invention is directed to a method for verifying a digital signature for a digital data comprising boot code for an apparatus or a second stage authentication key to be used to authenticate further digital data. Upon power up or reset of the apparatus, a processor receives the digital data and the digital signature; verifies the digital signature a plurality of times by obtaining a verification key and verifying the digital signature by processing the digital signature with the obtained verification key. A different verification key is obtained and used for each of the plurality of times.

In a first preferred embodiment, the obtaining step and the verifying step are performed in parallel.

In a second preferred embodiment, the obtaining step and the verifying step are iteratively performed until the digital signature is successfully verified or until the processor has unsuccessfully tried every available verification key.

BRIEF DESCRIPTION OF DRAWINGS

Preferred features of the present invention will now be described, by way of non-limiting example, with reference to the accompanying drawings, in which.

DESCRIPTION OF EMBODIMENTS

A main inventive idea of the present invention is to provide a receiver in a Conditional Access (CA) system that stores a plurality of authentication keys (PUAKs) in order to be able to verify signatures originating from a plurality of CA providers. The receiver is preferably a Set-Top Box (STB), but it may be any other suitable device such as a television set.

Figure 1:
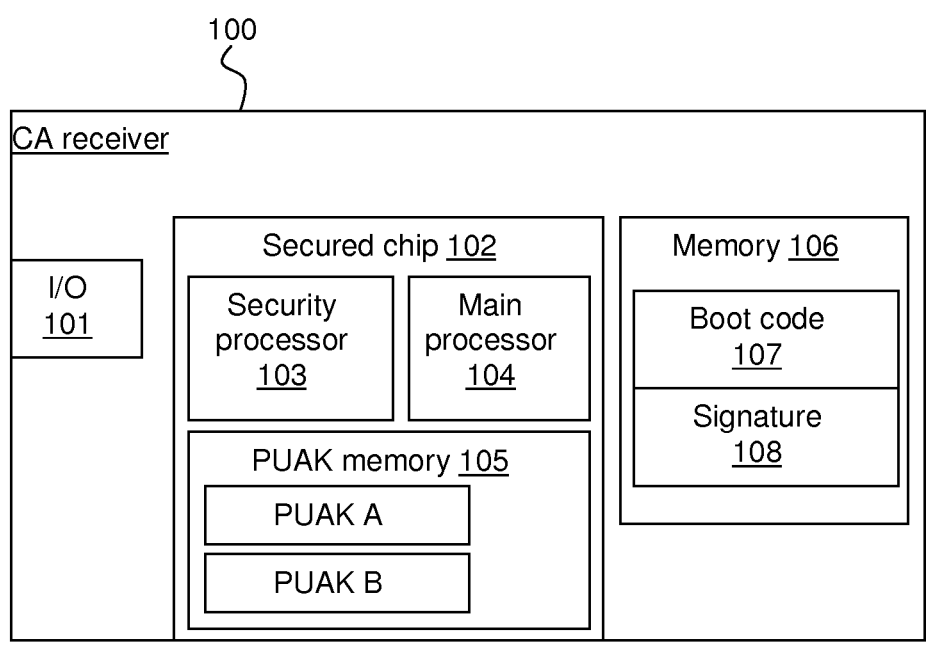
FIG. 1 illustrates the receiver according to a preferred embodiment of the present invention.

FIG. 1 illustrates the receiver according to a preferred embodiment of the present invention. The receiver 100 comprises a secured chip 102 and a first (preferably non-volatile) memory 106. It will be appreciated that only features needed for the present invention are illustrated in the figure.

The first memory 106 stores digital data 107, which in a preferred embodiment is software (hereinafter used as an example), advantageously so-called boot code that is used when the receiver is switched on or when it is reset, and a digital signature 108 for the software. It is preferred that the software 107 and the signature 108 are part of a single file. The digital data 107 may also be a second stage authentication key.

For reasons of efficiency, the secured chip 102 preferably comprises a security processor 103 and a main processor 104. The security processor 103 is configured to verify the software signature 108 as will be described hereinafter. The secured chip 102 further comprises a second memory 105, preferably a non-writable, i.e. read only memory (ROM) that holds a plurality of authentication keys (PUAKs). In FIG. 1, only two PUAKs: PUAK A and PUAK B. It will however be understood that it is advantageous to store at least as many PUAKs as there are CA providers that may use the secured chip—some CA providers may use a plurality of keys in order to provide a plurality of signatures on their software.

The receiver 100 as described so far is not sufficient to be compliant with a plurality of CA providers, as the security processor 103 does not know which PUAK to use for the verification of the signature 108.

Figure 2:
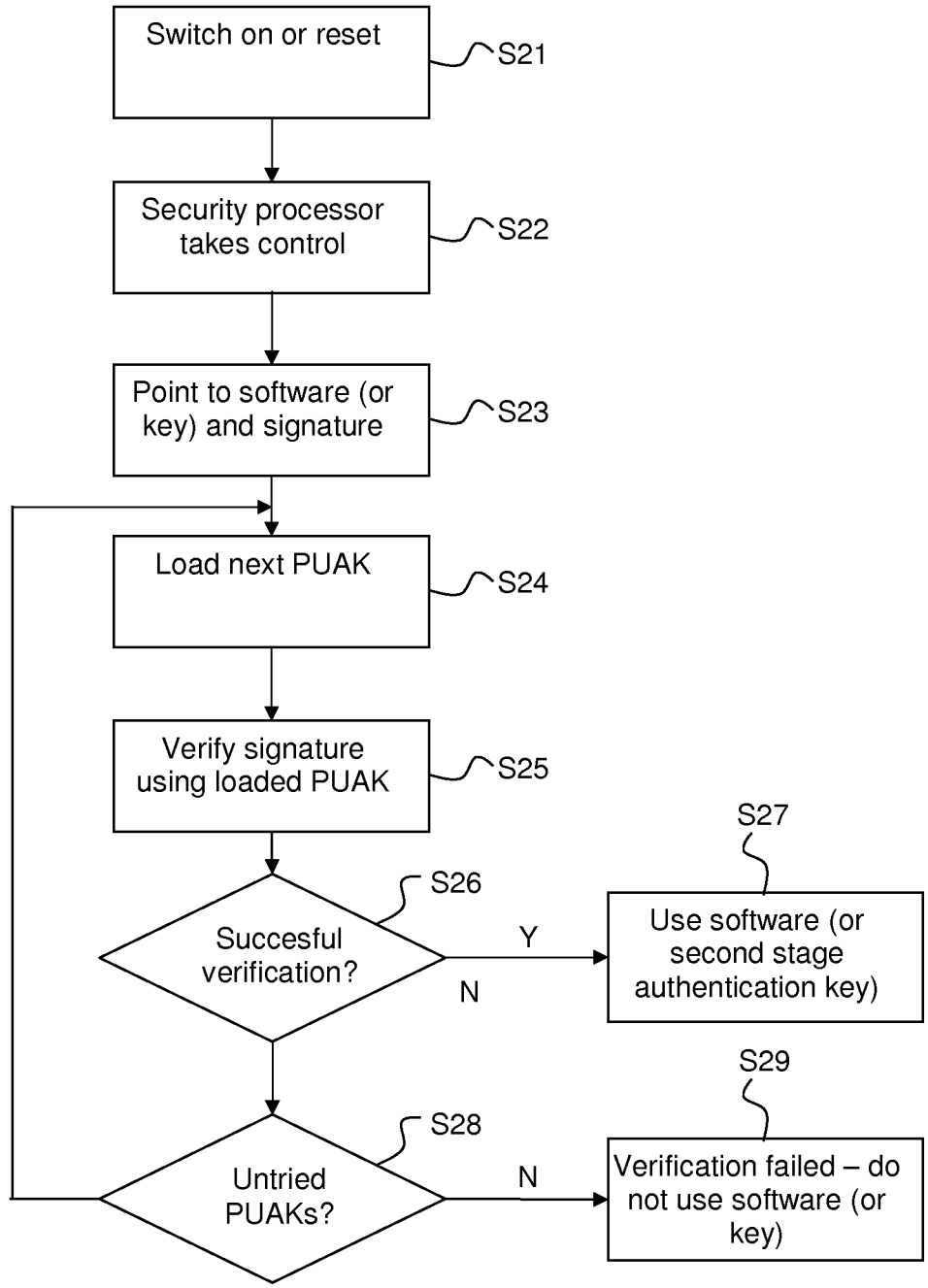
FIG. 2 illustrates a method for verification of a software or second stage authentication key signature according to a preferred embodiment of the present invention.

FIG. 2 illustrates a method for verification of a software signature 108 according to a preferred embodiment of the present invention.

In step S21, the receiver is switched on or reset, which requires the receiver to point to the software to be authenticated 107 stored in the first memory 106. It will be appreciated that the receiver at this point does not know what entity provided the software signature 108 and consequently does not know which PUAK to use.

The security processor 103 takes control of the secured chip 102, step S22. The software 107 and the signature 108 are then loaded from the first memory 106 to the secured chip 102, step S23.

The security processor 103 then loads a PUAK from the second memory 105, step S24, and uses it to verify the signature 108, step S25.

If the verification is successful—"Y" in step S26—then the software code is used in step S27; the verification method ends.

On the other hand, if the verification is unsuccessful—"N" in step S26—then it is verified if there are more PUAKs, i.e. PUAKs that have not been used for verification of the signature 108.

If there are no more signatures—"N" in step S28—then the verification has failed, step S29, the software should not be used as it cannot be verified, and the verification method ends. If there are untried signatures—"Y" in step S28—then the next PUAK is loaded from the second memory in step S25.

When the verification method has ended, the security processor 103 may give control of the secured chip back to the main processor 104. In case the data is a second stage authentication key, the secured chip may perform second stage authentication using the authenticated second stage authentication key.

Put another way, the method successively (iteratively) tries the stored PUAK keys to verify the software signature. If a PUAK verifies the signature, the software is successfully verified; if no PUAK verifies the signature, then the software is not successfully verified.

The skilled person will appreciate that it is also possible to try at least two PUAKs in parallel; the main point is that the software is successfully verified if one PUAK successfully verifies the software signature.

It will thus be appreciated that the present invention can provide a way for a receiver to verify a software signature, when the software signature may have been provided by any of a plurality of signatories. It will also be appreciated that this was not possible in previous systems as it was believed that there was no way of knowing which key to use. The present invention thus provides a radical new and surprising solution to an important and hitherto unsolved technical problem. In addition, the present invention can also make it possible to identify the CA system that is used, which in turn enables activation of CA specific functions in the receiver 100.

It will be appreciated that the method in no way is limited to verification of software code or indeed to digital data that is downloaded from an internal memory.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. An apparatus for verifying a digital signature for a digital data, the apparatus comprising:
    a first memory configured to store a first verification key;
    a second memory configured to store the digital data, the digital data comprising at least one of a boot code for the apparatus and a second stage authentication key to be used to further authenticate the digital data;
    a processor configured to, upon a power up or a reset of the apparatus, receive the digital data and a digital signature, and to verify the digital signature by processing the digital signature with the first verification key;
    wherein the first memory is further configured to store a second verification key, wherein the first verification key and the second verification key respectively correspond to a key of a first signatory entity and a key of a second signatory entity;
    and wherein the processor is further configured to verify the digital signature by processing the digital data with the second verification key.

2. The apparatus of claim 1, wherein the first memory is configured to store a plurality of verification keys.

3. The apparatus of claim 2, wherein the processor is configured to verify the digital signature using the digital signature and each of the stored verification keys until the digital signature is successfully verified.

4. The apparatus of claim 3, wherein the processor is configured to verify the digital signature by processing the digital signature with the second verification key when the digital signature is not successfully verified using the first verification key.

5. The apparatus of claim 1, wherein the processor is configured to verify the digital signature using the first verification key and the second verification key in parallel.

6. The apparatus of claim 1, wherein the boot code is embedded.

7. The apparatus of claim 6, wherein the apparatus further comprises a second processor configured to execute the boot code when the digital signature is successfully authenticated.

8. The apparatus of claim 1, the processor is further configured to, upon successful verification of the digital data, identify a current Conditional Access (CA) system and to activate at least one of a CA specific functions.

9. The apparatus of claim 1, wherein the first memory is a non-writable memory.

10. A method for verifying a digital signature for a digital data comprising at least one of a boot code for an apparatus and a second stage authentication key to be used to further authenticate the digital data, the method executed by one or more processors of one or more electronic devices, the method comprising:
    receiving, by a processor, the digital data and a digital signature upon a power up or a reset of the apparatus;
    verifying, by the processor, the digital signature a plurality of times by:
        obtaining a verification key; and
        processing the digital signature with the verification key;
    wherein a different verification key is obtained and used for each time of the plurality of times.

11. The method of claim 10, wherein obtaining the verification key and processing the digital signature with the verification key are performed in parallel.

12. The method of claim 10, wherein obtaining the verification key and processing the digital signature with the verification key are iteratively performed until the digital signature is successfully verified.

13. The method of claim 10, further comprising storing in a memory a plurality of verification keys, wherein the obtaining a verification key is from the memory.

14. The method of claim 10, further comprising verifying the digital signature by processing the digital signature with the second verification key when the digital signature is not successfully verified using the first verification key.

15. The method of claim 10, further comprising verifying the digital signature using the first verification key and the second verification key in parallel.

16. The method of claim 10, wherein the boot code is embedded, and the method further comprising executing, by a second processor, the boot code when the digital signature is successfully authenticated.

17. The method of claim 10, further comprising identifying, upon successful verification of the digital data, a current Conditional Access (CA) system and activating at least one of a CA specific functions.

18. A system for verifying a digital signature for a digital data, the system comprising:
    a first memory configured to store a first verification key and a second verification key, wherein the first verification key and the second verification key respectively correspond to a key of a first signatory entity and a key of a second signatory entity;
    a second memory configured to store the digital data, the digital data comprising at least one of a boot code for the apparatus and a second stage authentication key to be used to further authenticate the digital data; and
    a processor configured to, upon a power up or a reset of an apparatus, receive the digital data and a digital signature, and to verify the digital signature by processing the digital signature with the first verification key and to verify the digital signature by processing the digital data with the second verification key.

19. The system of claim 18, wherein the system is a Conditional Access (CA) system, and the processor is further configured to, upon successful verification of the digital data, identify a current Conditional Access (CA) system and to activate at least one of a CA specific functions.

20. The system of claim 19, wherein the first memory is configured to store a plurality of verification keys and the processor is configured to verify the digital signature using the digital signature and each of the stored verification keys until the digital signature is successfully verified.

* * * * *